US012545603B2

(12) United States Patent
Han et al.

(10) Patent No.: US 12,545,603 B2
(45) Date of Patent: Feb. 10, 2026

(54) DEVICE AND METHOD FOR SELECTIVE OXIDATION OF MACROMOLECULAR ORGANIC POLLUTANTS USING FREE RADICALS PRODUCED IN HETEROGENEOUS FENTON REACTION

(71) Applicants: Nanjing Huagong Innovation Environment Research Institute Co., Ltd., Nanjing (CN); Nanjing University of Science and Technology, Nanjing (CN)

(72) Inventors: Weiqing Han, Nanjing (CN); Kajia Wei, Nanjing (CN); Fang Huang, Nanjing (CN); Siqi Liu, Nanjing (CN); Run Liu, Nanjing (CN); Juncheng Dai, Nanjing (CN)

(73) Assignees: NANJING HUAGONG INNOVATION ENVIRONMENT RESEARCH INSTITUTE CO., LTD., Nanjing (CN); NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 989 days.

(21) Appl. No.: 17/707,941

(22) Filed: Mar. 29, 2022

(65) Prior Publication Data
US 2022/0315455 A1 Oct. 6, 2022

(30) Foreign Application Priority Data
Mar. 31, 2021 (CN) .......................... 202110348081.4

(51) Int. Cl.
*C02F 1/467* (2023.01)
*C02F 1/461* (2023.01)
(Continued)

(52) U.S. Cl.
CPC ........ *C02F 1/4672* (2013.01); *C02F 1/46109* (2013.01); *C02F 1/66* (2013.01);
(Continued)

(58) Field of Classification Search
CPC ...... C02F 1/4672; C02F 1/46109; C02F 1/66; C02F 2001/46133; C02F 2101/30;
(Continued)

(56) References Cited

U.S. PATENT DOCUMENTS

| | | | |
|---|---|---|---|
| 6,692,632 B1 * | 2/2004 | Bremner | C07C 37/60 205/464 |
| 2011/0233070 A1 * | 9/2011 | Machuca Martinez | C02F 1/4672 205/688 |

(Continued)

FOREIGN PATENT DOCUMENTS

CN 215208628 U * 12/2021

*Primary Examiner* — Bryan D. Ripa
(74) *Attorney, Agent, or Firm* — MATTHIAS SCHOLL P.C.; Matthias Scholl (57) ABSTRACT

Disclosed is a device for selective oxidation of macromolecular organic pollutants using free radicals produced in a heterogeneous Fenton reaction. The device includes a heterogeneous Fenton reaction unit and an electrochemical cell. The heterogeneous Fenton reaction unit includes a reactor and an anion exchange membrane. The anion exchange membrane is disposed in the reactor and separates the reactor into a first chamber and a second chamber. The first chamber is filled with a catalyst and the wastewater to be treated; and the second chamber is filled with a dielectric material. The electrochemical cell is configured to supply an electric field to the reactor, so that organic acids generated by a heterogeneous Fenton reaction move from the first chamber into the second chamber.

7 Claims, 7 Drawing Sheets

(51) Int. Cl.
*C02F 1/66* (2023.01)
*C02F 101/30* (2006.01)
(52) U.S. Cl.
CPC ............... *C02F 2001/46133* (2013.01); *C02F 2101/30* (2013.01); *C02F 2201/46115* (2013.01); *C02F 2201/46135* (2013.01); *C02F 2201/46185* (2013.01); *C02F 2209/06* (2013.01); *C02F 2305/026* (2013.01)
(58) Field of Classification Search
CPC .. C02F 2201/46115; C02F 2201/46135; C02F 2201/46185; C02F 2209/06; C02F 2305/026; C02F 1/722; C02F 1/725; C02F 1/46104; C02F 2209/02
See application file for complete search history.

(56) References Cited

U.S. PATENT DOCUMENTS

| | | | | |
|---|---|---|---|---|
| 2012/0305497 | A1* | 12/2012 | Ma | C02F 1/72 |
| | | | | 423/519.2 |
| 2021/0155514 | A1* | 5/2021 | Alshawabkeh | B01J 27/128 |

* cited by examiner

DEVICE AND METHOD FOR SELECTIVE OXIDATION OF MACROMOLECULAR ORGANIC POLLUTANTS USING FREE RADICALS PRODUCED IN HETEROGENEOUS FENTON REACTION

CROSS-REFERENCE TO RELATED APPLICATIONS

Pursuant to 35 U.S.C. § 119 and the Paris Convention Treaty, this application claims foreign priority to Chinese Patent Application No. 202110348081.4 filed Mar. 31, 2021, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of water treatment, and more particularly, to a device and a method for selective oxidation of macromolecular organic pollutants using free radicals produced in a heterogeneous Fenton reaction.

Conventional wastewater treatment methods involve pretreatment followed by biological treatment. As the untreated wastewater flows into a wastewater treatment device, the influent load increases, causing death of bacteria and paralysis of wastewater treatment system. Thus, facilities require pretreating the wastewater before it is subjected to the biological treatment. Advanced oxidation processes (AOPs) are effective in pretreating the wastewater, such as electrocatalytic oxidation, Fenton oxidation, and ozone oxidation. AOPs may be used to reduce the concentration of the pollutants in the wastewater. For example, the pollutants are broken down into low-molecular-weight organic acids with strong biodegradability, and then the organic substances can be mineralized (or broken down to carbon dioxide and water).

The conventional AOPs treatment technology is usually difficult to achieve a desired effect, with poor efficiency in the decomposition of the pollutants.

SUMMARY

To solve the aforesaid problems, the first objective of the disclosure is to provide a device for selective oxidation of macromolecular organic pollutants through free radicals in a heterogeneous Fenton reaction; the device comprises a reactor and an electrochemical cell as an assistant for improving the removal rate of the macromolecular organic pollutants.

The second objective of the disclosure is to provide a method for selective oxidation of macromolecular organic pollutants using free radicals produced in a heterogeneous Fenton reaction; the directional movement of the low-molecular-weight organic acids under an electric field enhances the effectiveness to eliminate the macromolecular organic pollutants in wastewater, and forms a pure carbon source suitable for use in biological reactions.

The third objective of the disclosure is to provide a method for enhancing the rate and completion of a heterogeneous Fenton reaction.

The device for selective oxidation of macromolecular organic pollutants using free radicals produced in a heterogeneous Fenton reaction comprises a heterogeneous Fenton reaction unit and an electrochemical cell;

the heterogeneous Fenton reaction unit comprises a reactor and an anion exchange membrane; the anion exchange membrane is disposed in the reactor and separates the reactor into a first chamber and a second chamber; the first chamber is filled with a catalyst and the wastewater to be treated; and the second chamber is filled with a dielectric material; and the electrochemical cell is configured to supply an electric field to the reactor, so that organic acids generated by a heterogeneous Fenton reaction move from the first chamber into the second chamber.

In a class of this embodiment, the device comprises a water circulator; the water circulator comprises an outlet pipe and a return pipe; the first chamber comprises a bottom part and a top part; the bottom part is connected to the outlet pipe and the top part is connected to the return pipe; when the heterogeneous Fenton reaction happens in the first chamber, a fixed bed is formed under the action of the water circulator.

In a class of this embodiment, the catalyst is non-conductive and used for heterogeneous Fenton oxidation.

The term "non-conductive catalyst" as used herein, refers to a catalyst comprising a lightweight non-conductive material, for example, an alumina particle functioning as a catalyst carrier is loaded with Fe and C elements. The main body of the catalyst is the alumina particle having no conductivity. When the catalyst is conductive, the low-molecular-weight organic acids are directly absorbed on the catalyst and thus are difficult to migrate in the electric field.

In a class of this embodiment, the dielectric material is ultrapure water or a low-concentration inorganic salt solution.

In a class of this embodiment, the electrochemical cell comprises a power supply, an anode, and a cathode; the anode and the cathode are electrically connected to the power supply; and the cathode is disposed in the first chamber; the anode is disposed in the second chamber; and the cathode is opposite to the anode.

The cathode and the anode are disposed outside the first chamber and the second chamber, respectively (so as to not be in contact with the wastewater); optionally, the cathode and the anode are disposed inside the first chamber and the second chamber, respectively (so as to be in contact with the wastewater), to facilitate the directional movement of the low-molecular-weight organic acids from the first chamber to the second chamber. Preferably, under otherwise the same processing conditions, the cathode and the anode are disposed inside the first chamber and the second chamber, respectively, to increase the amount of the low-molecular-weight organic acids (by at least 20%) in the second chamber without affecting the treatment effect in the first chamber.

In a class of this embodiment, the first chamber comprises a first sidewall away from the second chamber, and the cathode is attached to the first sidewall of the first chamber; the second chamber comprises a second sidewall away from the first chamber, and the anode is attached to the second sidewall of the second chamber; the catalyst is disposed between the cathode and the anode; the low-molecular-weight organic acids are produced via degradation of the pollutants in the first chamber and can migrate to the second chamber in a more efficient manner.

In a class of this embodiment, the anode is graphite felt or a carbon rod; and the cathode is platinum, titanium or stainless steel.

The method for selective oxidation of macromolecular organic pollutants using free radicals produced in a heterogeneous Fenton reaction comprises:
- S1. assembling a heterogeneous Fenton reaction unit; the heterogeneous Fenton reaction unit comprises a reactor and an anion exchange membrane; the anion exchange membrane is disposed in the reactor and separates the reactor into a first chamber and a second chamber; filling the first chamber with a catalyst; filling the second chamber with a dielectric material;
- S2. providing wastewater containing hydrogen peroxide and hydroxylamine hydrochloride; and measuring an original pH of the wastewater;
- S3. introducing the wastewater into the first chamber for heterogeneous Fenton reaction; connecting a power supply to the heterogeneous Fenton reaction unit; turning on the power supply, an electric field with an initial voltage is formed in the reactor, and organic acids generated by a heterogeneous Fenton solution in the reactor move from the first chamber into the second chamber.

The heterogeneous Fenton process for wastewater treatment involves breaking down the macromolecular organic pollutants into low-molecular-weight organic acids, and then breaking down the low-molecular-weight organic acids into carbon dioxide and water. A conventional heterogeneous Fenton oxidation reaction would not allow for complete degradation (or a concentration reduction) of the macromolecular organic pollutants in the wastewater. During the oxidation process, the macromolecular organic pollutants in the wastewater are only partially degraded when some free radicals react with the low-molecular-weight organic acids. Thus, the heterogeneous Fenton process is performed under the electric field to allow for directional movement of the low-molecular-weight organic acids, thus increasing the removal rate for macromolecular organic pollutants, and forming a pure carbon source suitable for use in biological reactions.

In a class of this embodiment, S3) further comprises monitoring a real-time pH of the wastewater in the first chamber and regulating the real-time pH of the wastewater by changing the voltage of the electric field.

As the reaction proceeds, a growing number of the low-molecular-weight organic acids are formed in the first chamber, decreasing pH of the wastewater. Thus, voltage regulation increases the migration speed of the anion from the first chamber into the second chamber, allowing the pH of the wastewater in the first chamber to decrease at a slow rate. The degree of the voltage is increased with the decrease in the pH of the wastewater, and the degree of the voltage affects the performance of the wastewater treatment.

In a class of this embodiment, in S1, a water circulator is connected to the heterogeneous Fenton reaction unit;
in S2, the original pH of the wastewater is 3-6;
in S3, when the water circulator is turned on, the wastewater flows through the water circulator and the first chamber successively to form a fixed bed, and the heterogeneous Fenton reaction happens in the first chamber.

When the power supply is turned on, an electric field with an initial voltage is formed in the reactor; and
the pH of the wastewater in the first chamber is monitored; when the pH exceeds an initial value, the voltage is regulated until the pH approaches to the initial value; and then the voltage returns to its initial value.

To improve the degradation efficiency (increased by at least 49.6% per unit time) of the organic matter in the heterogeneous Fenton process, the fixed bed is used to improve the mass transfer and a low frequency electric field is used to improve the ability of the free radicals to oxidize target organic matter.

In a class of this embodiment, a distance between the cathode and the anode is less than or equal to 5 cm; the maximum voltage of the eclectic field is less than or equal to 3 V, preferably, 1.23 V.

As the voltage increases, the electrolysis of water on the cathode surface produces hydroxide ions, which reduces the production of organic acids in the second chamber, causing pH variation in the cathode chamber and affecting the reaction process.

In a class of this embodiment, when the pH of the wastewater in the first chamber decreases by 1-2 compared to the original pH, the voltage of the electric field is increased by 0.1-0.2 V.

The voltage is adjusted to facilitate directional movement of the low-molecular-weight organic acids, thus increasing the pH value of the wastewater in the first chamber; additionally, the voltage regulation reduces the generation of hydroxide ions and retains the low molecular organic acid.

In a class of this embodiment, the volume of the catalyst accounts for 50%-80% of the first chamber.

When the amount of catalyst is too small, the heterogeneous Fenton oxidation reaction is slowed down, affecting the reaction effect; when the amount of catalyst is too large, the amount of the water entering the cathode chamber is decreased, so that the catalyst is unable to make full contact with the wastewater, which affects the mass transfer efficiency.

In a class of this embodiment, the water circulator is a peristaltic pump;
when the initial voltage is 0.5-1 V, the peristaltic pump works at 50-100 rpm;
when the initial voltage is 1-2 V, the peristaltic pump works at 100-150 rpm; and
when the initial voltage is 2-3 V, the peristaltic pump works at 150-200 rpm.

When the peristaltic pump operates at the above rotational speed, the catalyst is in contact with the wastewater to enhance the mass transfer efficiency, thus increasing the reaction rate without affecting the directional migration of low-molecular-weight organic acids.

In a class of this embodiment, in the oxidization process, the macromolecular organic pollutants in the wastewater are broken down into intermediate product, i.e. the low-molecular-weight organic acids, such as phenolic compounds (phenol, bisphenol A, hydroquinone, etc.), nitrogen-containing heterocyclic compounds (pyrazole, etc.), aromatic hydrocarbons (toluene, etc.).

In a class of this embodiment, the concentration of the catalyst is 50-200 g/L, and preferably, 100-200 g/L.

In a class of this embodiment, the anode is graphite felt or a carbon rod; and the cathode comprises platinum, titanium or stainless steel.

In a class of this embodiment, the reaction temperature is 10-40° C., preferably, 20-30° C.

The following advantages are associated with the device and the method of the disclosure:

1. The heterogeneous Fenton reaction unit comprises a reactor and an anion exchange membrane; the anion exchange membrane is disposed in the reactor and separates the reactor into a first chamber and a second chamber; the first chamber is filled with a catalyst and the wastewater to be treated; and the second chamber is filled with a dielectric material.

The heterogeneous Fenton process is performed under the electric field to allow the low-molecular-weight organic acids to move from the first chamber to the second chamber, thus preventing the low-molecular-weight organic acids from being absorbed by the catalyst, increasing the removal rate for macromolecular organic pollutants, and forming a pure carbon source used in biological reactions.

2. The water treatment method couples the low frequency electric field with the heterogeneous Fenton reaction so as to increase the removal rate for macromolecular organic pollutants, obtain pure and concentrated low-molecular-weight organic acids, and form a pure carbon source suitable for use in biological reactions.

In particular, the pollutant degradation efficiency varies with voltage. The low frequency electric field reduces the energy consumption during the oxidation process and improves the stability of catalyst materials and electrode materials. The catalyst materials have no electrical conductivity, which prevents the catalyst from being damaged by an applied voltage, thus improving the service life of the catalyst.

3. The oxidation process is carried out in mild reaction conditions, easy to operate and discharged without pollutants, thus providing commercial and industrial values.

DETAILED DESCRIPTION OF THE DRAWINGS

Figure 1:
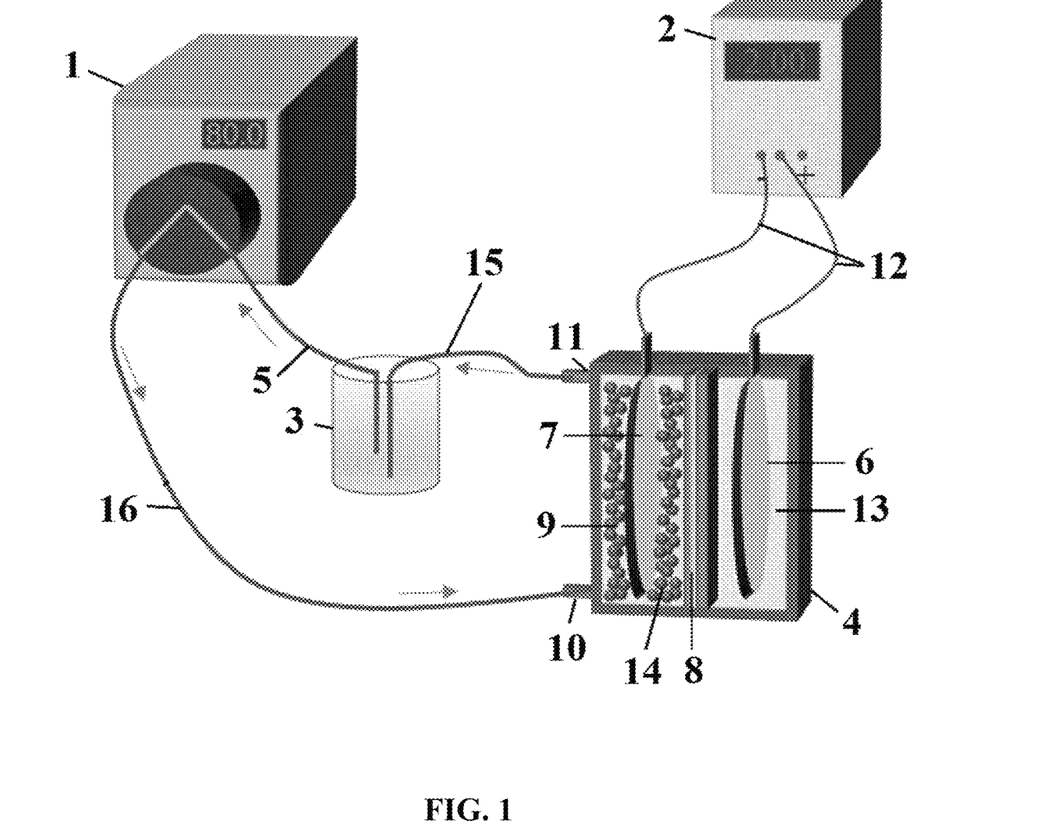
FIG. 1 is a perspective view of a device for selective oxidation of macromolecular organic pollutants using free radicals produced in a heterogeneous Fenton reaction.

In the drawings, the following reference numbers are used: 1. Peristaltic pump; 2. Power supply; 3. Water tank; 4. Reactor; 5. Pipeline; 6. Anode; 7. Cathode; 8. Anion exchange membrane; 9. Catalyst; 10. Bottom water inlet; 11. Top water outlet; 12. Conducting wire; 13. Second chamber; 14. First chamber; 15. Return pipe; and 16. Outlet pipe.

DETAILED DESCRIPTION

Unless otherwise defined, all terms (including technical and scientific terms) used herein have the same meaning as commonly understood by one of ordinary skill in the art to which this disclosure belongs. As used herein, "and/or" refers to and encompasses any and all possible combinations of one or more of the associated listed items.

Unspecified reaction conditions follow conventional conditions or manufacturer's recommendations. Reagents or instruments that do not specify the manufacturer or preparation method are conventional products that can be purchased from the market.

Throughout this application, various examples of this disclosure may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 3 should be considered to have specifically disclosed subranges such as from 1 to 2.5, from 2 to 2.8 etc., as well as individual numbers within that range, for example, 2 and 2.5. The same principle applies to ranges defined by only one numerical value, such as "less than or equal to about 3."

As used herein, the term "about" or "approximately," as applied to one or more values of interest, refers to a value that is similar to a stated reference value.

As used herein, the term "free radicals" refers to the hydroxyl radicals that are strongly oxidizing in a heterogeneous Fenton reaction.

As used herein, the term "selective" refers to the maximum degree of oxidation of macromolecular organic pollutants in a heterogeneous Fenton reaction.

The scope of the disclosure is defined by the appended claims and its legal equivalents, rather than by the description and examples given in the specification.

The disclosure is to provide a device for selective oxidation of macromolecular organic pollutants using free radicals produced in a heterogeneous Fenton reaction.

As shown in FIG. 1, the device comprises a heterogeneous Fenton reaction unit, an electrochemical cell, and a water circulator; the heterogeneous Fenton reaction unit comprises a reactor 4 and an anion exchange membrane 8; the anion exchange membrane is disposed in the reactor and separates the reactor into a first chamber 14 (also known as a cathode chamber) and a second chamber 13 (also known as an anode chamber); the first chamber is filled with a catalyst 9, hydrogen peroxide, and the wastewater to be treated; and the second chamber 13 is filled with a dielectric material.

The electrochemical cell supplies electricity to the reactor 4, and the low-molecular-weight organic acids generated by the heterogeneous Fenton process move from the first chamber 14 into the second chamber 13. Further, the electrochemical cell comprises a power supply 2, an anode 6, and a cathode 7; the anode 6 and the cathode 7 are electrically connected to the power supply 2 through a conducting wire 12, respectively; the first chamber comprises a sidewall away from the second chamber, and the cathode 7 is attached to the sidewall of the first chamber 14; the second chamber 13 comprises a sidewall away from the first chamber, and the anode 6 is attached to the sidewall of the second chamber 13; the catalyst 9 is disposed between the cathode 7 and the anode 6; the low-molecular-weight organic acids are produced via degradation of the pollutants in the first chamber 14 and migrate to the second chamber 13. The anode 6 is graphite felt or a carbon rod; and the cathode 7 is platinum, titanium or stainless steel.

The cathode 7 and the anode 6 are disposed outside the first chamber 14 and the second chamber 13, respectively (so as to not be in contact with the wastewater); optionally, the cathode 7 and the anode 6 are disposed outside the first chamber 14 and the second chamber 13, respectively (so as be in contact with the wastewater), to facilitate the directional movement of the low-molecular-weight organic acids from the first chamber 14 to the second chamber 13.

The water circulator comprises a water tank 3, a peristaltic pump 1, an outlet pipe 16, and a return pipe 15; the peristaltic pump 1 is connected to the water tank 3 through a pipeline 5; the first chamber comprises a bottom water inlet 10 and a top water outlet 11; both ends of the return pipe 15 are connected to the top water outlet 11 and the water tank 3, respectively; both ends of the outlet pipe are connected to the bottom water inlet 10 and the peristaltic pump 1; when the heterogeneous Fenton reaction happens in the first chamber 14, a fixed bed is formed under the action of the water circulator.

The working principle of the device is detailed as follows:
S1. when the heterogeneous Fenton reaction unit is turned on, the first chamber 14 is filled with the catalyst 9, the second chamber 13 is filled with the dielectric material; and a certain amount of hydrogen peroxide and hydroxylamine hydrochloride is added to the wastewater;
S2. the water circulator (i.e. the peristaltic pump) is turned on, the wastewater flows through the water circulator and the first chamber successively to form a fixed bed, and the heterogeneous Fenton reaction happens in the first chamber 14; when the power supply 2 is turned on, an electric field with an initial voltage is formed in the reactor; and
S3. as the heterogeneous Fenton reaction proceeds, the wastewater is measured to determine its real-time pH; the voltage is regulated to prevent the pH from exceeding the initial range.

A preparation method of the catalyst comprises loading the alumina particles onto a Fe/C catalyst for heterogeneous Fenton oxidation, further comprising:
1. the porous alumina particles with a particle size of 3-5 mm are washed and dried in an oven at 80° C. for 24 hours;
2. 6 g of ferric citrate and 10 g of glucose are slowly added to 50 mL of deionized water at 25° C., and stirred magnetically for 12 hours to form a precursor solution;
3. the dried porous alumina particles in 1) are immersed in the precursor solution in 2), captured by a vacuum pump for 30 min, immersed in the precursor solution for 30 min, separated from the precursor solution, air-dried overnight and placed in an oven at 80° C. for 24 hours; and
4. the porous alumina particles obtained in 3) are placed in a vacuum tube furnace; helium is introduced to the vacuum tube furnace to provide a protective environment; and the porous alumina particles are calcined at 600° C. for two hours to obtain the catalyst 9 for heterogeneous Fenton oxidation.

Figure 2:
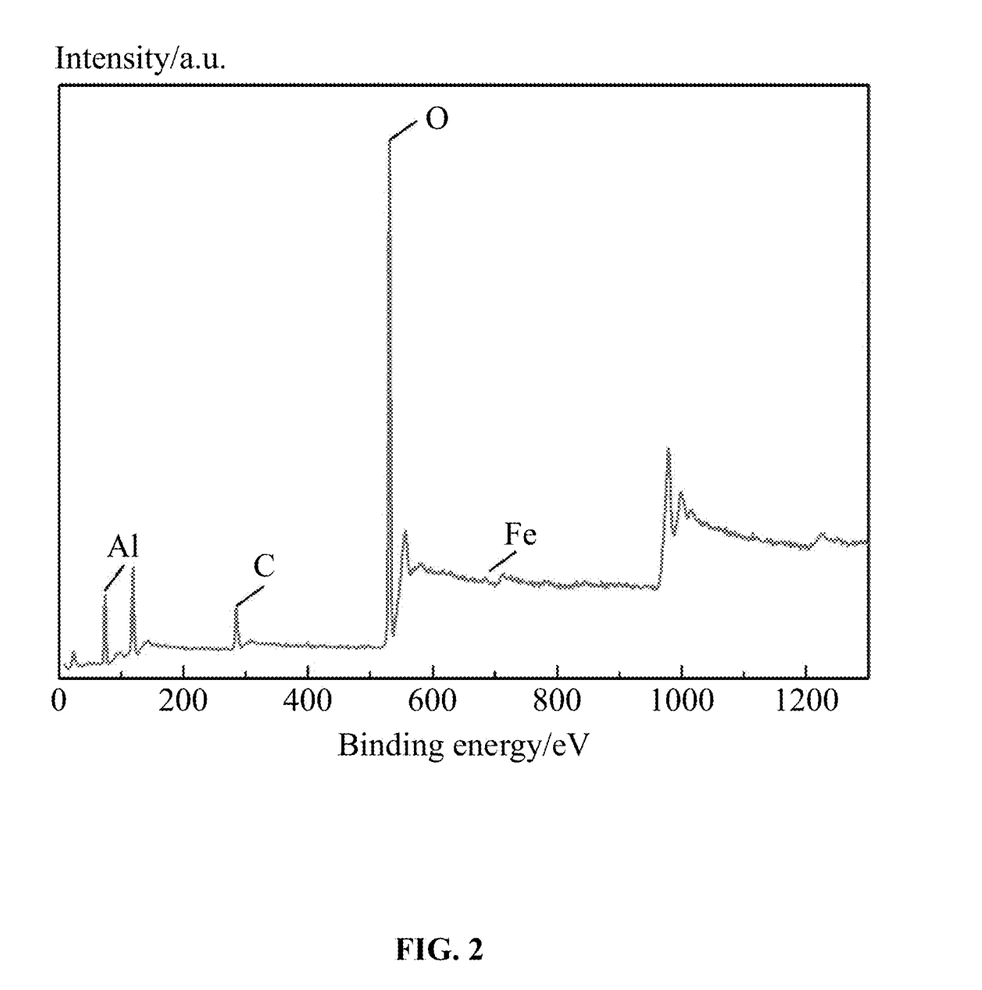
FIG. 2 is an X-ray phototelectron spectrum (XPS) of the catalyst loaded with Fe and C elements.

FIG. 2 is an X-ray phototelectron spectrum (XPS) of the catalyst of the disclosure. The results show that Fe and C elements are found in the catalyst of the disclosure.

Figure 3:
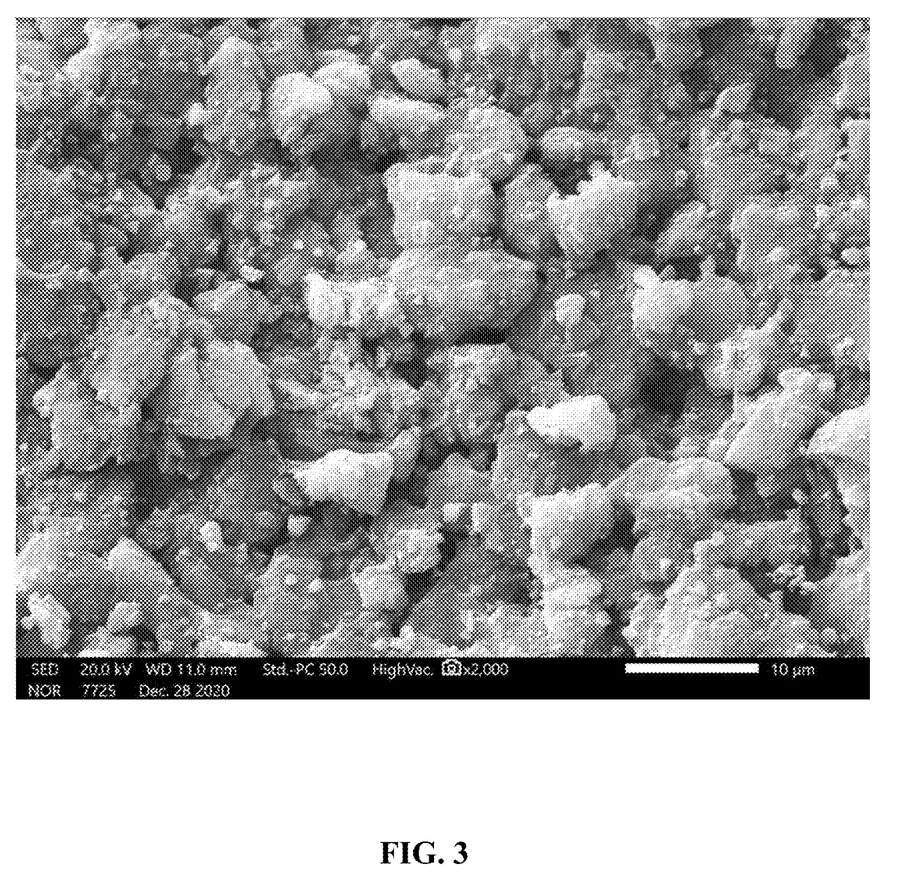
FIG. 3 is a scanning electron microscopy (SEM) image of the catalyst loaded with Fe and C elements.

FIG. 3 is a scanning electron microscope (SEM) image of the catalyst of the disclosure. The results show that iron oxides and carbon are calcined on the surface of the porous alumina particles to provide abundant active sites for catalytic reaction.

Example 1

The first example of using the device to treat a wastewater containing 100 mg/L pyrazole is illustrated as follows:
S1. the anion exchange membrane 8 separated the reactor 4 into two chambers; the reactor 4 was used for degradation reaction heterogeneous Fenton and comprised a top part provided with an opening; a stainless steel plate and a graphite felt were of the same size, inserted through an opening into the first chamber 14 and the second chamber 13, respectively, disposed vertically and parallel to each other, and connected to the power supply 2 through the conducting wires 12; the stainless steel plate was used as a cathode and the graphite felt was used as an anode; the catalyst 9 was passed through the opening into the first chamber 14; the concentration of the catalyst was 100 g/L; the ultrapure water was added to the second chamber until the water level was about equal to the water level in the first chamber;

a clean beaker was placed outside the reactor 4 and functioned as the water tank 3; the wastewater was poured into the water tank; hydrogen peroxide and hydroxylamine hydrochloride were added to the water tank and functioned as an oxidizing agent and a reducing agent, respectively; the concentration of the oxidizing agent was 10 mmol/L, and the concentration of the reducing agent was 0.1 g/L;

the pH of the wastewater was adjusted to 4.0; and the reaction temperature was held at 80° C.

S2. The power supply was turned on; the initial voltage was set to 1.23 V; the water circulator (i.e. the peristaltic pump) was turned on, and the wastewater flowed through the pipeline 5, the peristaltic pump 1, the outlet pipe 16 and the bottom water inlet 10 successively, and was pumped into the first chamber 14 for heterogeneous Fenton oxidization; the effluent flowed through the top water outlet 11 and the return pipe 15, and was stored in the water tank 3. The water tank-first chamber-water tank constituted a circulating fixed bed system.

The peristaltic pump 1 operated at a speed of 80 rpm to control the effluent velocity.

S3. during the same time interval, a certain amount of the solution in the cathode chamber was extracted by a pipette and measured to determine its real-time pH; the voltage was regulated to prevent the pH from being acidic; when the pH value of the solution decreased by 1-2 compared to the initial pH value, the voltage was increased by 0.1-0.2 V; when the pH approaches to the initial value, the voltage returned to its initial value.

Figure 4:
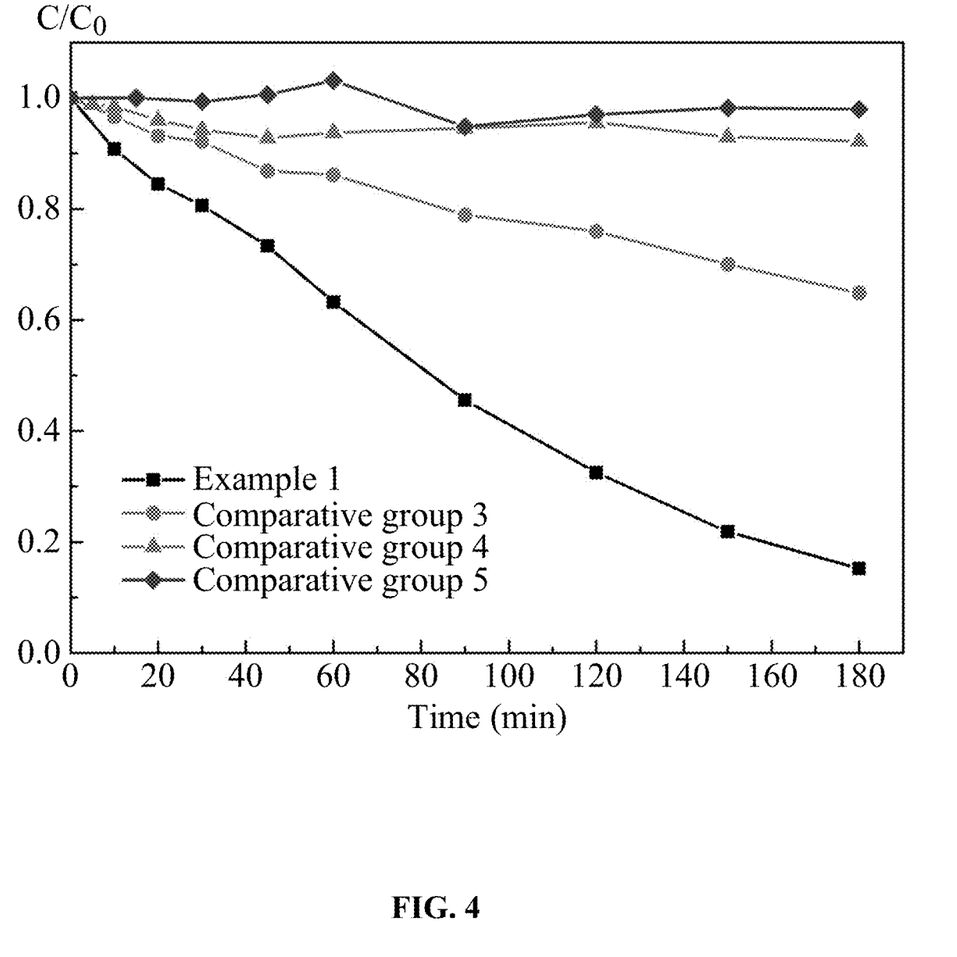
FIG. 4 is a graph showing a degradation efficiency curve of pyrazole in Example 1 and Comparison Examples 3-5.

At the same time, a certain amount of the solution in the first chamber 14 was extracted by a pipette, moved to a centrifuge tube, measured by high performance liquid chromatography to calculate change in the concentration of pyrazole, and shown by a curved graph. FIG. 4 is a graph showing a degradation efficiency curve of pyrazole in Example 1. The results show that coupling the electric field with the heterogeneous Fenton system improves the pyrazole degradation efficiency when compared to a single heterogeneous Fenton system or a single electric field.

Comparison Example 1

Four experimental groups are illustrated as follows. They are similar to Example 1, except for the specific differences as shown in Table 1.

| | Experimental data | | | |
|---|---|---|---|---|
| | Initial voltage (V) | Voltage regulation | pH variation in cathode chamber after oxidation | Degradation efficiency of pyridine in wastewater |
| Group I | 3 | Yes | 7.6 | 75.8% |
| Group II | 1 | Yes | 6.5 | 99.3% |
| Group III | 1 | No | 3.2 | 92.6% |
| Group IV | 5 | Yes | 8.2 | 70.4% |

Figure 6:
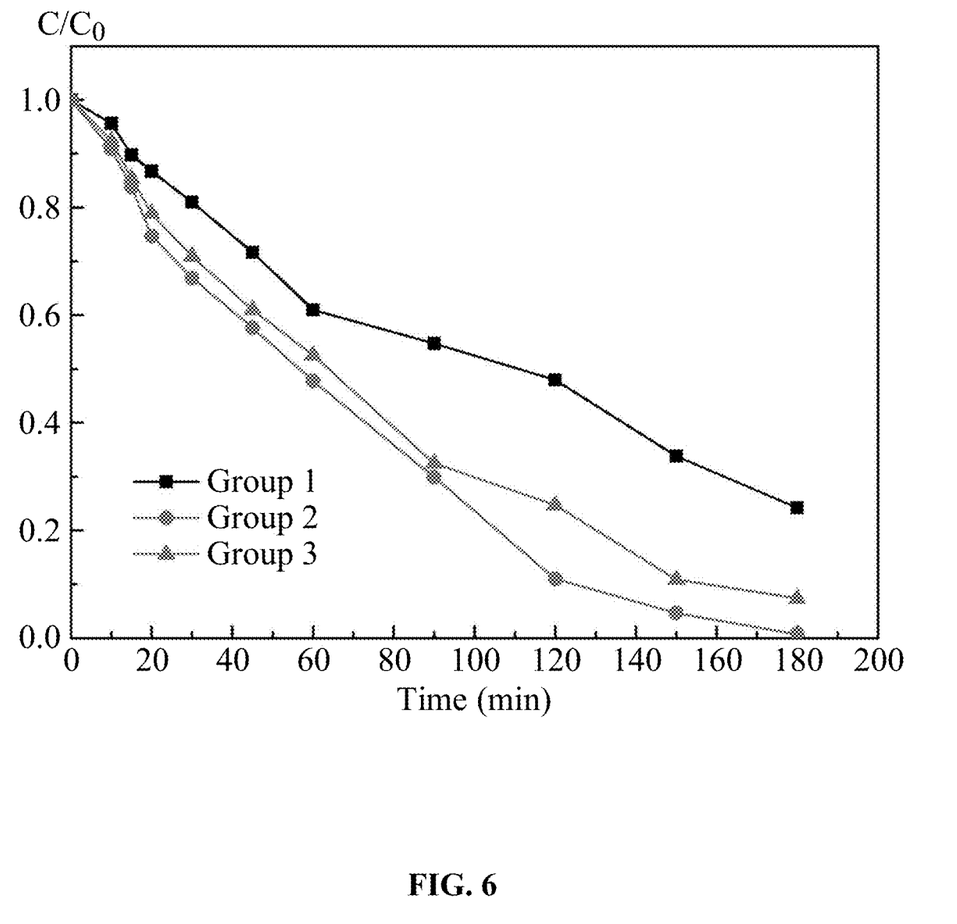
FIG. 6 is a graph showing a degradation efficiency curve of pyrazole in Example 1 and Comparison Example 1.

As shown in Table 1 and FIG. 6, the initial voltage has a significant effect on the removal of organic pollutants in the wastewater.

Comparison Example 2

Comparison Example 2 is similar to Example 1, except for the following specific differences: the pH variation in the cathode chamber is not measured.

Figure 7:
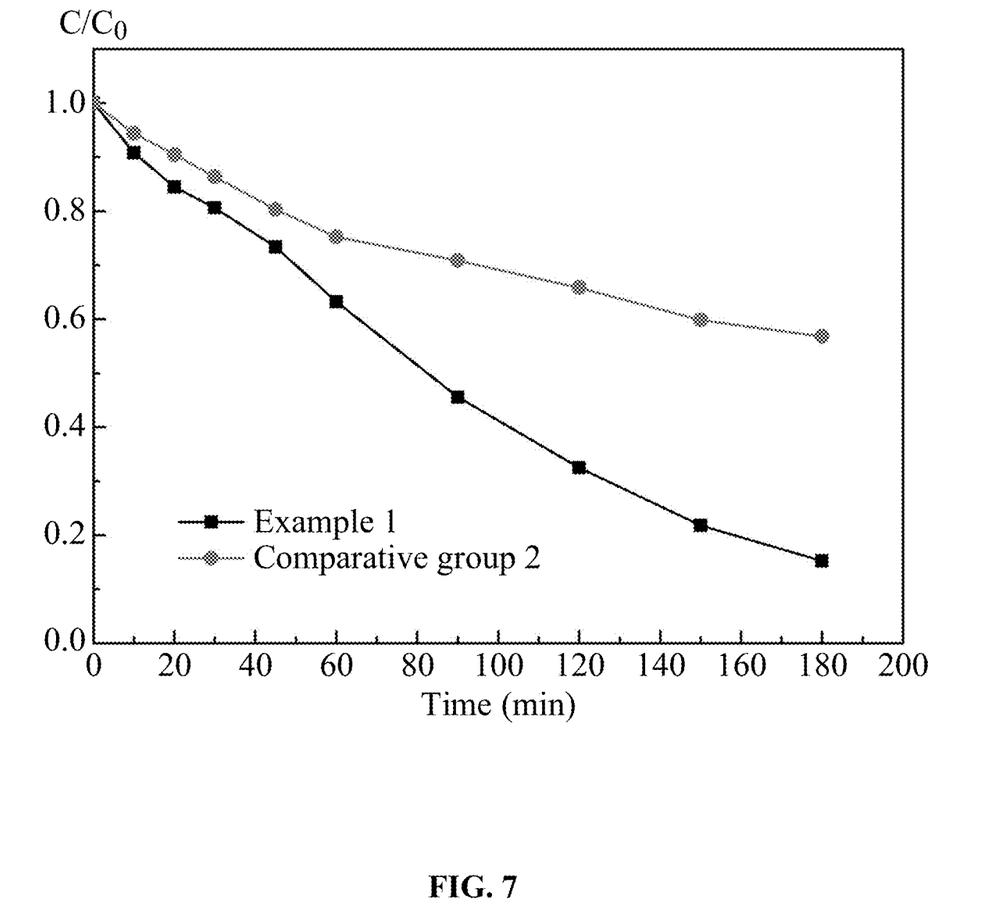
FIG. 7 is a graph showing a degradation efficiency curve of pyrazole in Example 1 and Comparison Example 2.

As shown in FIG. 7, under otherwise the same processing conditions, when the pH of the wastewater in the cathode chamber is not adjusted, and the removal rate of pyrazole in Comparison Example 2 is significantly lower than that of Example 1.

Comparison Example 3

The device and the wastewater in Comparison Example 3 is the same as that of Example 1;

Comparison Example 3 is similar to Example 1, except for the following specific differences: in 2), the power supply is turned on and the initial voltage is kept at 0 V; and in 3), it is unnecessary to measure the real-time pH of the wastewater or adjust the voltage; and no electric field is generated in the reactor.

FIG. 4 is a graph showing a degradation efficiency curve of pyrazole in Comparison Example 3. As shown in FIG. 4, the voltage is set to zero, and no electric field is formed in the oxidation process. Since a single heterogeneous Fenton process cannot oxidize the target organic pollutants, the degradation efficiency of pyrazole decreases in Comparison Example 3, as compared to Example 1.

Comparison Example 4

The device and the wastewater in Comparison Example 4 are the same as that of Example 1;

Comparison Example 4 is similar to Example 1, except for the following specific differences: in S1, no catalyst is added to the first chamber 14.

FIG. 4 is a graph showing a degradation efficiency curve of pyrazole in Comparison Example 4. The catalyst is not provided in Comparison Example 5, and the heterogeneous Fenton oxidation does not happen in the reactor. In the absence of the catalyst, hydrogen peroxide is unable to generate free radicals for oxidation of the unwanted organic pollutants, resulting in a decreased pyrazole degradation efficiency, as compared to Example 1.

Comparison Example 5

The device and the wastewater in Comparison Example 5 is the same as that of Example 1;

Comparison Example 5 is similar to Example 1, except for the following specific differences: in S1, no catalyst is added to the first chamber 14, and no hydrogen peroxide is added to the wastewater.

FIG. 4 is a graph showing a degradation efficiency curve of pyrazole in Comparison Example 5. The catalyst and hydrogen peroxide are not provided in Comparison Example 5, and the heterogeneous Fenton oxidation does not happen in the reactor. The results show that almost no active free radicals are generated, and only electrochemical reduction occurs at the cathode. The degradation efficiency of pyrazole in Comparison Example 5 is less than that in Example 1.

Example 2

The second example of using the device to treat a wastewater containing 200 mg/L pyrazole is illustrated as follows:

S1. the anion exchange membrane 8 separated the reactor 4 into two chambers; the reactor 4 was used for degradation reaction and comprised a top part provided with an opening; a stainless steel plate and a graphite felt were of the same size, inserted through an opening into the first chamber 14 and the second chamber 13 respectively, disposed vertically and parallel to each other, and connected to the power supply 2 through the conducting wires 12; the stainless steel plate was used as a cathode and the graphite felt was used as an anode;

the catalyst 9 was added to the first chamber 14 through the opening; the concentration of the catalyst was 200 g/L; the ultrapure water was added to the second chamber until the water level was about equal to the water level in the first chamber;

a clean beaker was placed outside the reactor 4 and functioned as the water tank 3; the wastewater was poured into the water tank; hydrogen peroxide and hydroxylamine hydrochloride were added to the water tank and functioned as an oxidizing agent and a reducing agent, respectively; the concentration of the oxidizing agent was 20 mmol/L, and the concentration of the reducing agent was 0.1 g/L; and     the pH of the wastewater was adjusted to 5.0; and the reaction temperature was held at 30° C.

S2. The power supply was turned on; the initial voltage was set to 1 V; the water circulator (i.e. the peristaltic pump) was turned on so that the wastewater can flow through the pipeline 5, the peristaltic pump 1, the outlet pipe 16 and the bottom water inlet 10 successively, and was pumped into the first chamber 14 for heterogeneous Fenton oxidation; the effluent flowed through the top water outlet 11 and the return pipe 15 and was stored in the water tank 3; the water tank-first chamber-water tank constituted a circulating fixed bed system; and The peristaltic pump 1 operated at a speed of 100 rpm to control the effluent velocity.

S3. during the same time interval, a certain amount of the solution in the cathode chamber was extracted by a pipette and measured to determine its real-time pH; the voltage was regulated to prevent the pH from being acidic; when the pH value of the solution decreased by 1-2 compared to the initial pH value, the voltage was increased by 0.1-0.2 V; when the pH approaches to the initial value, the voltage returned to its initial value.

Figure 5:
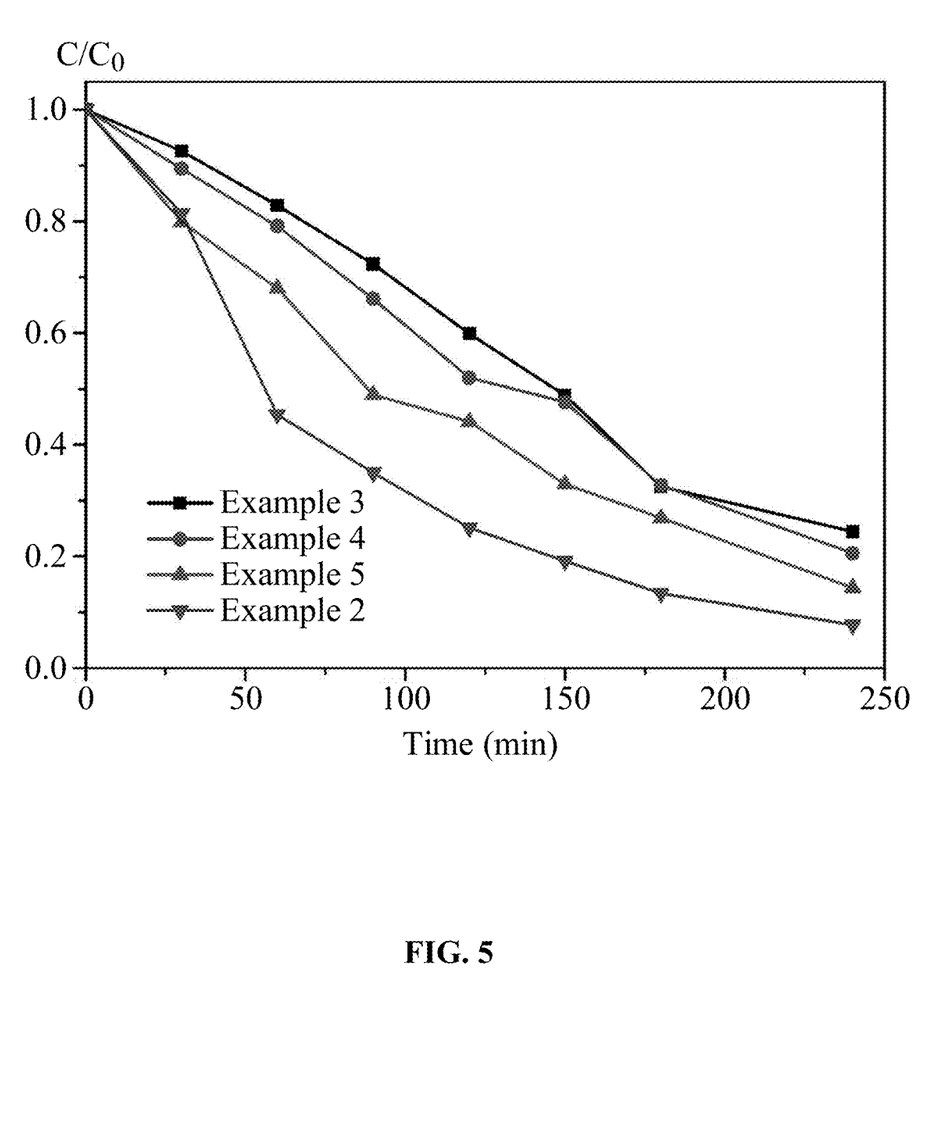
FIG. 5 is a graph showing a degradation efficiency curve of pyrazole in Examples 2-5.

At the same time, a certain amount of the solution in the first chamber 14 was extracted by a pipette and moved to centrifuge tube, measured by high performance liquid chromatography to determine the concentration of the low-molecular-weight organic acids. FIG. 5 is a graph showing a degradation efficiency curve of pyrazole in Example 2.

Example 3

The third example of using the device to treat a wastewater containing 200 mg/L pyrazole is illustrated as follows:

S1. the anion exchange membrane 8 separated the reactor 4 into two chambers; the reactor 4 was used for degradation reaction and comprised a top part provided with an opening; a stainless steel plate and a graphite felt were of the same size, inserted through an opening into the first chamber 14 and the second chamber 13 respectively, disposed vertically and parallel to each other, and connected to the power supply 2 through the conducting wires 12; the stainless steel plate was used as a cathode and the graphite felt was used as an anode;

the catalyst 9 was added to the first chamber 14 through the opening; the concentration of the catalyst was 150 g/L; the ultrapure water was added to the second chamber until the water level was about equal to the water level in the first chamber;

a clean beaker was placed outside the reactor 4 and functioned as the water tank 3; the wastewater was poured into the water tank; hydrogen peroxide and hydroxylamine hydrochloride were added to the water tank and functioned as an oxidizing agent and a reducing agent, respectively; the concentration of the oxidizing agent was 20 mmol/L, and the concentration of the reducing agent was 0.1 g/L; and the pH of the wastewater was adjusted to 5.0; and the reaction temperature was held at 20° C.

S2. The power supply was turned on; the initial voltage was set to zero; the water circulator (i.e. the peristaltic pump) was turned on so that the wastewater can flow through the pipeline 5, the peristaltic pump 1, the outlet pipe 16 and the bottom water inlet 10 successively, and was pumped into the first chamber 14 for heterogeneous Fenton oxidization; the effluent flowed through the top water outlet 11 and the return pipe 15 and was stored in the water tank 3. The water tank-first chamber-water tank constituted a circulating fixed bed system;

The peristaltic pump 1 operated at a speed of 120 rpm to control the effluent velocity.

S3. during the same time interval, a certain amount of the solution in the cathode chamber was extracted by a pipette and measured to determine its real-time pH; the voltage was regulated to prevent the pH from being acidic; when the pH value of the solution decreased by 1-2 compared to the initial pH value, the voltage was increased by 0.1-0.2 V; when the pH approaches to the initial value the voltage returned to its initial value.

At the same time, a certain amount of the solution in the first chamber 14 was extracted by a pipette and moved to a centrifuge tube, measured by high performance liquid chromatography to determine the concentration of the low-molecular-weight organic acids. FIG. 5 is a graph showing a degradation efficiency curve of pyrazole in Example 3.

Example 4

The fourth example of using the device to treat a wastewater containing 200 mg/L pyrazole is illustrated as follows:

S1. the anion exchange membrane 8 separated the reactor 4 into two chambers; the reactor 4 was used for degradation reaction and comprised a top part provided with an opening; a stainless steel plate and a graphite felt were of the same size, inserted through an opening into the first chamber 14 and the second chamber 13 respectively, disposed vertically and parallel to each other, and connected to the power supply 2 through the conducting wires 12; the stainless steel plate was used as a cathode and the graphite felt was used as an anode;

the catalyst 9 was added to the first chamber 14 through the opening; the concentration of the catalyst was 250 g/L; ultrapure water was added to the second chamber until the water level was about equal to the water level in the first chamber;

a clean beaker was placed outside the reactor 4 and functioned as the water tank 3; the wastewater was poured into the water tank; hydrogen peroxide and hydroxylamine hydrochloride were added to the water tank and functioned as an oxidizing agent and a reducing agent, respectively; the concentration of the oxidizing agent was 20 mmol/L, and the concentration of the reducing agent was 0.1 g/L; and the pH of the wastewater was adjusted to 6.0; and the reaction temperature was held at 20° C.

S2. The power supply was turned on; the initial voltage was set to 0.5 V; the water circulator (i.e. the peristaltic pump) was turned on so that the wastewater can flow through the pipeline 5, the peristaltic pump 1, the outlet pipe 16 and the bottom water inlet 10 successively, and was pumped into the first chamber 14 for heterogeneous Fenton oxidization; the effluent flowed through the top water outlet 11 and the return pipe 15 and was stored in the water tank 3. The water tank-first chamber-water tank constituted a circulating fixed bed system; and The peristaltic pump 1 operated at a speed of 80 rpm to control the effluent velocity.

S3. during the same time interval, a certain amount of the solution in the cathode chamber was extracted by a pipette and measured to determine its real-time pH; the voltage was regulated to prevent the pH from being acidic; when the pH value of the solution decreased by 1-2 compared to the initial pH value, the voltage was increased by 0.1-0.2 V; when the pH approaches to the initial value, the voltage returns to its initial value.

At the same time, a certain amount of the solution in the first chamber 14 was extracted by a pipette, moved to a centrifuge tube, measured by high performance liquid chromatography to calculate change in the concentration of pyrazole, and shown by a curved graph. FIG. 5 is a graph showing a degradation efficiency curve of pyrazole in Example 4.

Example 5

The fifth example of using the device to treat a wastewater containing 200 mg/L pyrazole is illustrated as follows:

S1. the anion exchange membrane 8 separated the reactor 4 into two chambers; the reactor 4 was used for degradation reaction and comprised a top part provided with an opening; a stainless steel plate and a graphite felt were of the same size, inserted through an opening into the first chamber 14 and the second chamber 13 respectively, disposed vertically and parallel to each other, and connected to the power supply 2 through the conducting wires 12; the stainless steel plate was used as a cathode and the graphite felt was used as an anode;

the catalyst 9 was added to the first chamber 14 through the opening; the concentration of the catalyst was 200 g/L; the ultrapure water was added to the second chamber until the water level was about equal to the water level in the first chamber;

a clean beaker was placed outside the reactor 4 and functioned as the water tank 3; the wastewater was poured into the water tank; hydrogen peroxide and hydroxylamine hydrochloride were added to the water tank and functioned as an oxidizing agent and a reducing agent, respectively; the concentration of the oxidizing agent was 20 mmol/L, and the concentration of the reducing agent was 0.1 g/L; and the pH of the wastewater was adjusted to 5.0; and the reaction temperature was held at 20° C.

S2. The power supply was turned on; the initial voltage was set to 0.8 V; the water circulator (i.e. the peristaltic pump) was turned on so that the wastewater can flow through the pipeline 5, the peristaltic pump 1, the outlet pipe 16 and the bottom water inlet 10 successively, and was pumped into the first chamber 14 for heterogeneous Fenton oxidization; the effluent flowed through the top water outlet 11 and the return pipe 15 and was stored in the water tank 3. The water tank-first chamber-water tank constituted a circulating fixed bed system; and The peristaltic pump 1 operated at a speed of 80 rpm to control the effluent velocity.

S3. during the same time interval, a certain amount of the solution in the cathode chamber was extracted by a pipette and measured to determine its real-time pH; the voltage was changed to prevent the pH from being acidic; when the pH value of the solution decreased by 1-2 compared to the initial pH value, the voltage was increased by 0.1-0.2 V; when the pH approaches to the initial value, the voltage returned to its initial value.

At the same time, a certain amount of the solution in the first chamber 14 was extracted by a pipette, moved to a centrifuge tube, measured by high performance liquid chromatography to calculate change in the concentration of pyrazole, and shown by a curved graph. FIG. 5 is a graph showing a degradation efficiency curve of pyrazole in Example 5.

As shown in Examples 2-5, coupling the low-frequency electric field with the heterogeneous Fenton system enhances the effectiveness to improve the pyrazole degradation efficiency. The results of high performance liquid chromatography show that the amount of pyrazole in the fixed bed of the cathode chamber is significantly less than that when no voltage is applied. When the fixed bed in the cathode chamber is energized, the organic acid radicals are repelled, facilitating control of selective oxidation of macromolecular organic pollutants using free radicals produced in a heterogeneous Fenton reaction.

It will be obvious to those skilled in the art that changes and modifications may be made, and therefore, the aim in the appended claims is to cover all such changes and modifications.

The invention claimed is:

1. A method for selective oxidation of macromolecular organic pollutants using free radicals produced in a heterogeneous Fenton reaction, the method comprising:
   1) assembling a device, the device comprising a heterogeneous Fenton reaction unit and an electrochemical cell; the heterogeneous Fenton reaction unit comprising a reactor and an anion exchange membrane disposed in the reactor to separate the reactor into a first chamber and a second chamber; filling the first chamber with a catalyst; and filling the second chamber with a dielectric material;
   2) providing wastewater containing hydrogen peroxide and hydroxylamine hydrochloride; and measuring an original pH of the wastewater; and
   3) introducing the wastewater into the first chamber; connecting a power supply to the heterogeneous Fenton reaction unit; turning on the power supply, an electric field with an initial voltage is formed in the reactor, and organic acids generated by a heterogeneous Fenton solution in the reactor move from the first chamber into the second chamber.

2. The method of claim 1, wherein 3) further comprises monitoring a real-time pH of the wastewater in the first chamber and regulating the real-time pH of the wastewater by changing a voltage of the electric field.

3. The method of claim 1, wherein:
   in 1), a water circulator is connected to the heterogeneous Fenton reaction unit;
   in 2), the original pH of the wastewater is 3-6;
   in 3), when the water circulator is turned on, the wastewater flows through the water circulator and the first chamber successively to form a fixed bed, and the heterogeneous Fenton reaction happens in the first chamber; when the power supply is turned on, an electric field with an initial voltage is formed in the reactor; the pH of the wastewater in the first chamber is monitored; when the pH exceeds the original pH, the voltage is regulated until the pH approaches to the original pH; and then the voltage returns to its initial value.

4. The method of claim 3, wherein an anode and a cathode are electrically connected to the power supply; the cathode is disposed in the first chamber; the anode is disposed in the second chamber; a distance between the cathode and the anode is less than or equal to 5 cm; and a maximum voltage of the eclectic field is less than or equal to 3 V.

5. The method of claim 4, wherein when the pH of the wastewater in the first chamber decreases by 1-2 compared to the original pH, the voltage of the electric field is increased by 0.1-0.2 V.

6. The method of claim 5, wherein the water circulator is a peristaltic pump;
   when the initial voltage is 0.5-1 V, the peristaltic pump works at 50-100 rpm;
   when the initial voltage is 1-2 V, the peristaltic pump works at 100-150 rpm; and
   when the initial voltage is 2-3 V, the peristaltic pump works at 150-200 rpm.

7. The method of claim 1, wherein the wastewater comprises macromolecular organic pollutants which are degraded into low-molecular-weight organic acids through the heterogeneous Fenton reaction in the reactor.

\* \* \* \* \*